(12) United States Patent
Mo et al.

(10) Patent No.: US 11,729,207 B2
(45) Date of Patent: Aug. 15, 2023

(54) HIERARCHICAL NOVELTY DETECTION USING INTENDED STATES FOR NETWORK SECURITY

(71) Applicant: VMware, Inc., Palo Alto, CA (US)

(72) Inventors: Zhen Mo, Sunnyvale, CA (US); Vijay Ganti, Fremont, CA (US); Debessay Fesehaye Kassa, Mountain View, CA (US); Barak Raz, San Francisco, CA (US); Honglei Li, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 202 days.

(21) Appl. No.: 16/900,240

(22) Filed: Jun. 12, 2020

(65) Prior Publication Data

US 2021/0392160 A1     Dec. 16, 2021

(51) Int. Cl.
*H04L 9/40*         (2022.01)

(52) U.S. Cl.
CPC ...... *H04L 63/1441* (2013.01); *H04L 63/0236* (2013.01); *H04L 63/1416* (2013.01); *H04L 63/1425* (2013.01); *H04L 63/20* (2013.01)

(58) Field of Classification Search
CPC ............. H04L 63/1441; H04L 63/0236; H04L 63/1416; H04L 63/1425; H04L 63/20
USPC .......................................................... 726/22
See application file for complete search history.

(56) References Cited

U.S. PATENT DOCUMENTS

| | | | |
|---|---|---|---|
| 7,523,016 B1* | 4/2009 | Surdulescu | H04L 63/1416 702/185 |
| 9,245,121 B1* | 1/2016 | Luo | H04L 63/14 |
| 10,715,543 B2* | 7/2020 | Jakobsson | H04L 63/1433 |
| 2006/0085854 A1* | 4/2006 | Agrawal | G06F 21/552 726/23 |
| 2008/0306715 A1* | 12/2008 | Tsai | G06F 21/55 703/2 |
| 2011/0271341 A1* | 11/2011 | Satish | G06F 21/566 726/23 |

(Continued)

OTHER PUBLICATIONS

List of TCP and UDP port numbers, https://en.wikipedia.org/wiki/List of TCP and UDP port numbers.

(Continued)

*Primary Examiner* — Teshome Hailu
(74) *Attorney, Agent, or Firm* — Patterson + Sheridan, LLP

(57) ABSTRACT

The disclosure provides an approach for detecting and preventing attacks in a network. Embodiments include determining a plurality of network behaviors of a process by monitoring the process. Embodiments include generating a plurality of intended states for the process based on subsets of the plurality of network behaviors. Embodiments include determining a plurality of intended state clusters by applying a clustering technique to the plurality of intended states. Embodiments include determining a state of the process. Embodiments include identifying a given cluster of the plurality of intended state clusters that corresponds to the state of the process. Embodiments include selecting a novelty detection technique based on a size of the given cluster. Embodiments include using the novelty detection technique to determine, based on the given cluster and the state of the process, whether to generate a security alert for the process.

20 Claims, 6 Drawing Sheets

(56) References Cited

U.S. PATENT DOCUMENTS

| | | | | |
|---|---|---|---|---|
| 2014/0165188 A1* | 6/2014 | Giblin | ................... | G06F 21/45 |
| | | | | 726/21 |
| 2015/0244733 A1* | 8/2015 | Mohaisen | ............. | G06F 21/561 |
| | | | | 726/23 |
| 2018/0191758 A1* | 7/2018 | Abbaszadeh | ....... | H04L 63/1425 |
| 2018/0288077 A1* | 10/2018 | Siddiqui | ................ | H04L 63/20 |

OTHER PUBLICATIONS

Zhexue Huang. Clustering large data sets with mixed numeric and categorical values. Proceedings of the First Pacific Asia Knowledge Discovery and Data Mining Conference, Singapore, pp. 21-34, 1997.

Zhexue Huang. Extensions to the k-modes algorithm for clustering large data sets with categorical values. Data Mining and Knowledge Discovery 2(3), pp. 283-304, 1998.

Fei Tony Liu, Kai Ming Ting, Zhi-Hua Zhou. Isolation Forest. Proceedings of the 2008 Eighth IEEE International Conference on Data Mining, NW Washington, DC United States.

* cited by examiner

HIERARCHICAL NOVELTY DETECTION USING INTENDED STATES FOR NETWORK SECURITY

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

The rapid growth of network virtualization has led to an increase in large scale SDN data centers. The scale of such data centers may be very large, often including hundreds of servers with each server hosting hundreds of VCIs. With such scale comes a need to be able to operate such topologies efficiently and securely.

A malicious attack (e.g., such as performed by malware) on a physical computing system or VM often attacks the application level (e.g., by spreading through the operating environment, introducing new processes, manipulating processes to communicate with new insecure devices, etc.). A security manager (e.g., AppDefense™ from VMware, Inc. in Palo Alto, Calif.) aims to protect against malicious attacks in data centers. The security manager is a data center endpoint security system that protects applications running on clients (e.g., VMs) in (e.g., logical) networks. For example, the security manager may allow or disallow connections (e.g., a connection between endpoints and corresponding to a source IP address, source port, destination IP address, and destination port), generate warnings or notifications, or perform other actions when a security threat is detected. In some embodiments, a security manager enforces policies defined in a management plane and/or by an administrator.

In some cases, a security manager relies on learned rules to detect threats and potential attacks. First, VMs may be placed in discovery mode for a period of time so that the security manager may learn the VM's behaviors as rules. Then the VMs are placed in protected mode, in which the security manager alerts users for any behavior violating the previous learned rules, and users can take remediation actions responding to these alerts.

However, simple rule-based detection methods may introduce security holes into the system. For example, all behaviors learned in discovery mode may not necessarily be normal because adversaries may have already compromised a VM before or during the discovery mode. As a result, the security manager may learn malicious behaviors as rules. Furthermore, a production environment may have more than two million unique processes that exhibit network behaviors, and the number may continue to grow as new customers join. It is difficult to make use of rule-based system in supporting such a large amount of data with small variation. Additionally, the rule-based system is inflexible once it has learned rules, which may lead to false positive alerts. For example, regardless of how long a VM is placed in discovery mode, any software upgrade or new software installation during protected mode can induce unknown behaviors. These unknown behaviors may be sent to customers as potential attack alerts, though they are actually normal operations that were not learned during discovery mode.

As such, there is a need in the art for improved techniques of detecting and preventing security threats in data centers.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
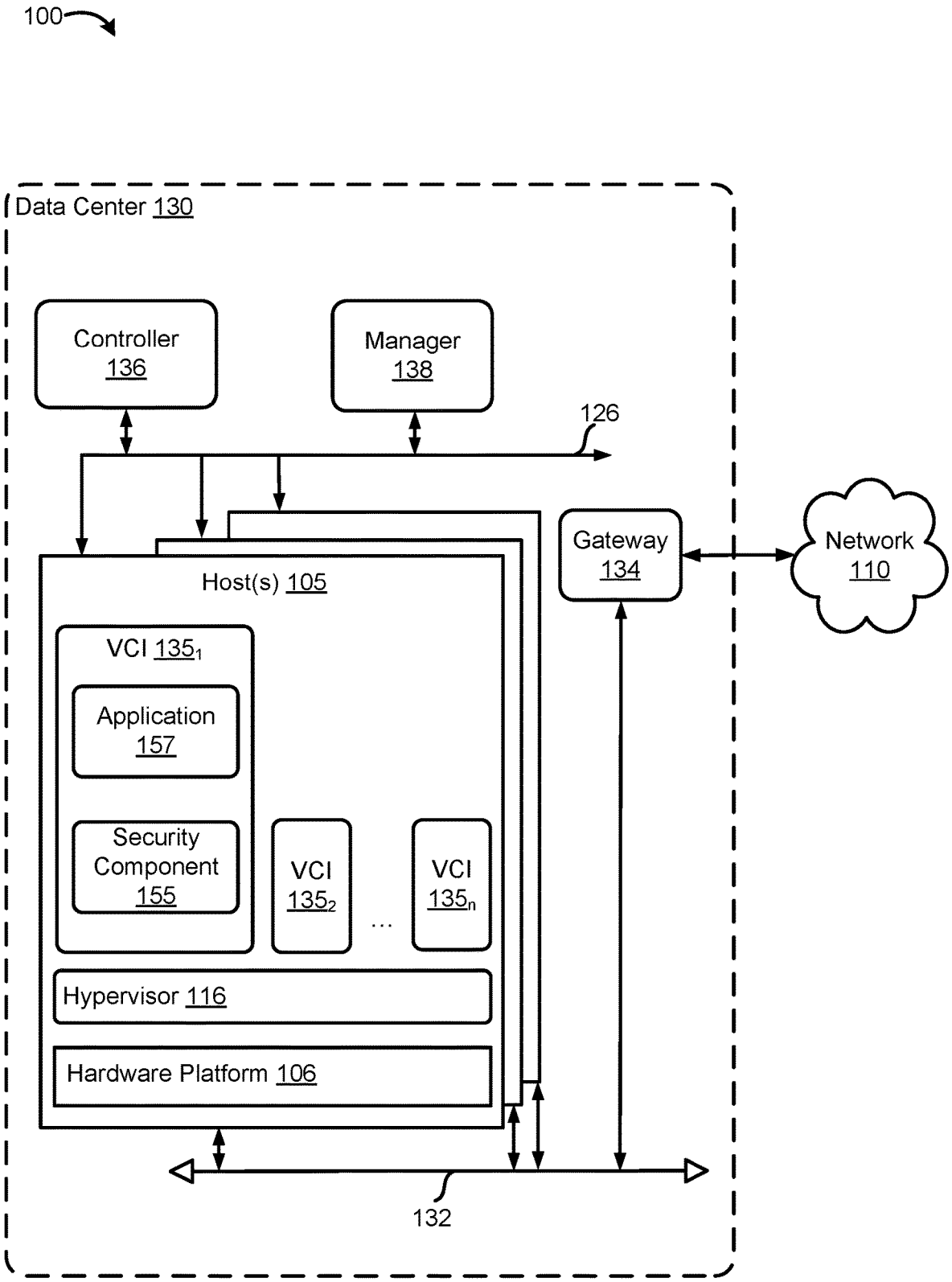
FIG. 1 depicts example physical and virtual network components with which embodiments of the present disclosure may be implemented.

The present disclosure provides an approach for identifying and preventing security threats in data centers. In particular, techniques described herein involve observing intended states of a process, generating additional intended states, clustering the intended states, and employing different novelty detection techniques based on sizes of clusters in order to identify and prevent security threats.

In order to detect whether a system, such as a virtual machine (VM), in a data center may be the target of an attack, a security component generally monitors behaviors (e.g., network connections) of processes running on the system and compares the behaviors to rules. The rules may be provided by an administrator or may be learned by observing "normal" behaviors of the processes during a learning mode. Embodiments of the present disclosure involve observing behaviors of a process to determine "intended states" of the process, meaning sets of features that are normal and acceptable for the process to exhibit, and do not represent a security threat. Features may include, for example, whether the process makes an outbound connection or receives an inbound connection on a given port or a particular type of port. The intended states of a process may be observed across multiple instances of the process, such as running on multiple VMs.

Furthermore, because it may not be possible to observe all intended states of a process (e.g., due to the very large number of intended states that may exist for a process), embodiments of the present disclosure involve generating intended states of the process that have not been observed but can be extrapolated based on those that have been observed. As described in more detail below, this may involve combining different subsets of the intended states that have been observed.

A clustering algorithm is then applied to all of the intended states, including those that were observed and those that were generated. As described in more detail below, a number of clusters may be selected, and the intended states may be split into the number of clusters.

The clustered intended states are used to identify and prevent security threats. For example, a state of the process may be determined (e.g., in a "real-time" production environment) and compared to the intended states using a novelty detection technique. In some embodiments, the state of the process is compared to one or more reference points in each cluster to determine which cluster it is closest to. Then, as described in more detail below, a novelty detection technique may be selected based on a size of the cluster to which the state corresponds. For example, certain novelty detection techniques may be more effective for larger clusters, while other novelty detection techniques may be more effective for smaller clusters. As described below, novelty detection techniques may include, for example, the use of tree-based machine learning models for large clusters, direct comparisons (e.g., using similarity metrics) for small clusters, or, in the case of very small clusters, manual review.

If the state of the process is determined to be "novel" (e.g., different than the intended states), then the security component may determine that a security threat is present. The security component may, for instance, provide an alert indicating the potential threat, such as to the management plane or to one or more other components that may take action to prevent the threat.

FIG. 1 depicts example physical and virtual network components with which embodiments of the present disclosure may be implemented.

Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Gateway 134 provides VCIs 135 and other components in data center 130 with connectivity to network 110, and is used to communicate with destinations external to data center 130 (not shown). Gateway 134 may be a virtual computing instance, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user.

VCI $135_1$, which may representative of other VCIs 135, includes a security component 155 and an application 157. Security component 155 generally performs operations related to detecting and preventing security threats, such as by monitoring behaviors of processes (e.g., application 157) on VCI $135_1$ and applying rules to determine whether security threats may be present. For example, as described in more detail below with respect to FIGS. 2 and 3, security component 155 may observe behaviors of application 157 in order to determine intended states of application 157.

In some embodiments, as described in more detail below with respect to FIG. 4, security component 155 may generate intended states that have not been observed by combining different subsets of behaviors that have been observed. Furthermore, as described in more detail below with respect to FIG. 5, security component 155 may apply a clustering algorithm to the intended states to produce a plurality of clusters. Security component 155 then compares states of application 157 (e.g., in real-time) to the clustered intended states to determine whether a security threat may be present. In some embodiments, security component 155 determines which cluster a given state is closest to, and then chooses a novelty detection technique based on the size of the cluster in order to determine whether the given state is anomalous (e.g., novel compared to the intended states). Selection of novelty detection techniques based on cluster size is described in more detail below with respect to FIGS. 5 and 6.

Security component 155 may generate alerts when potential security threats are detected. In some cluster embodiments, security component 155 sends alerts to manager 138. In certain embodiments, security component also takes additional actions to prevent detected threats, such as by blocking traffic, removing processes from the system, and/or the like.

Figure 2:
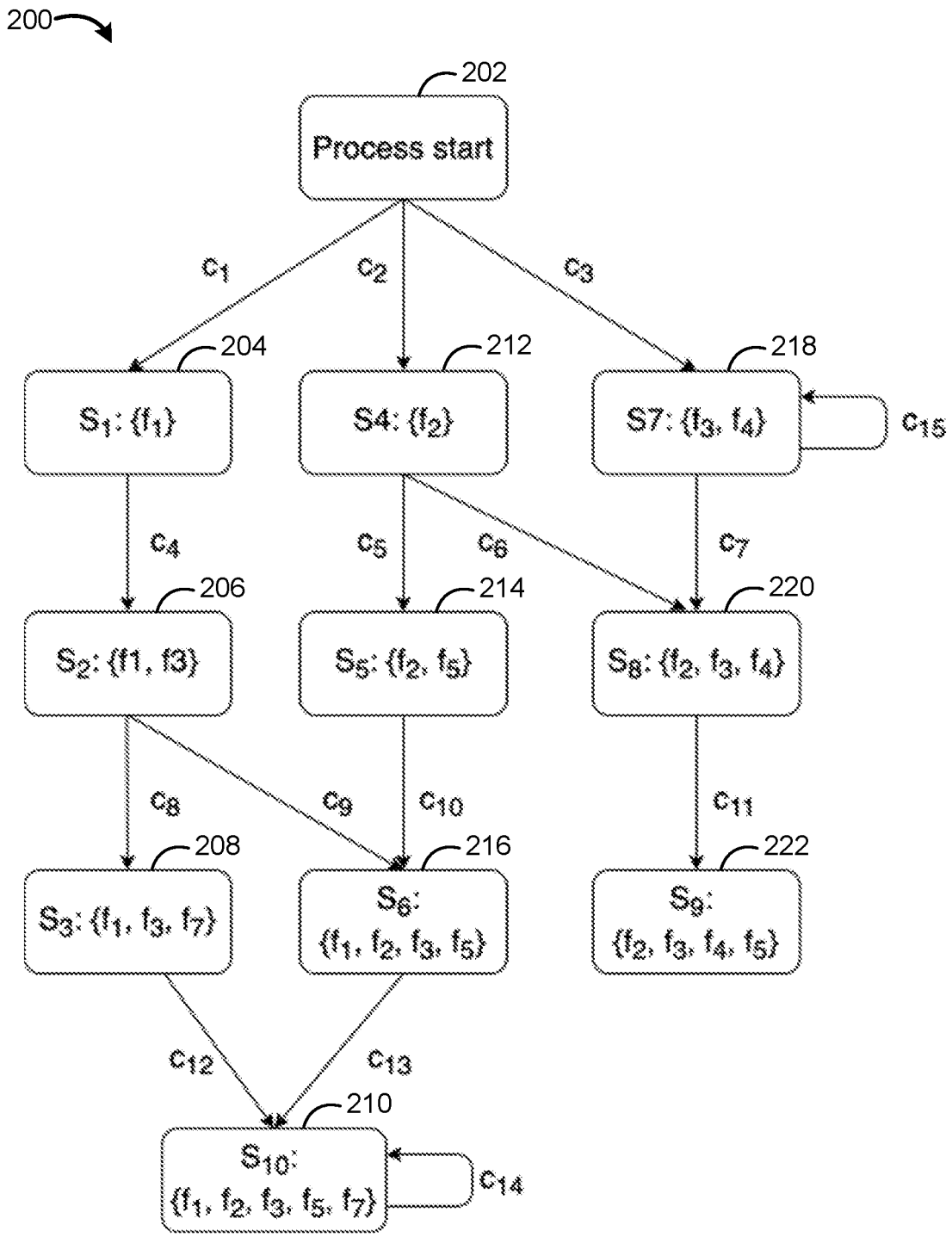
FIG. 2 depicts an example of intended states related to identifying and preventing security threats according to embodiments of the present disclosure.

FIG. 2 is a flow chart 200 illustrating intended states related to identifying and preventing security threats according to embodiments of the present disclosure. For example, flow chart 200 may depict behaviors of application 157 of FIG. 1, which may be observed by security component 155 of FIG. 1.

At step 202, the process starts. Subsequently, various behaviors (e.g., $c_1$-$c_{15}$) take place and result in various states ($S_1$-$S_{10}$) of the process. Following the process start at step 202, behaviors $c_1$, $c_2$, and $c_3$ represent the beginnings of three different execution paths of the process. For example, the process may have executed three different times on the same or different systems, and each time a different execution path occurs.

A state represents a set of features produced by the behaviors that have taken place so far during execution of the process. In one example, a behavior is an outbound transmission control protocol (TCP) connection on a well-known port X to a public internet protocol (IP) address, and the features produced by the behavior include Boolean values indicating that the process has made an outbound connection to a public IP address, that the process has made an outbound TCP connection on a well-known port, and that the process has made an outbound TCP connection on port X. Thus, a state produced by the behavior may comprise a feature vector including these Boolean values. The feature vector may also include Boolean values for other features that remain unchanged by the behavior. For example, the feature vector may include a Boolean value indicating that the process has not received an inbound TCP connection on an ephemeral port. In other embodiments, features may include non-Boolean values, such as a number of connections on a given port.

Behavior $c_1$ produces feature $f_1$, and so, at step 204, state $S_1$ includes feature $f_1$. Subsequently, behavior $c_2$ produces feature $f_3$, and so, at step 206, state $S_2$ includes features $f_1$ and $f_3$. Next, behavior $c_8$ produces feature $f_7$, and so, at step 208, state $S_3$ includes features $f_1$, $f_3$, and $f_7$. In an alternative execution path, behavior $c_9$ is performed instead of behavior $c_8$ after step 206. Behavior $c_9$ produces features $f_2$ and $f_5$, and so, at step 216, state $S_6$ includes features $f_1$, $f_2$, $f_3$, and $f_5$. State $S_6$ is also produced in an alternate execution path by behaviors $c_2$, $c_5$, and $c_{10}$.

After step 208, behavior $c_{12}$ produces features $f_2$ and $f_5$, and so, at step 210, state $S_{10}$ includes features $f_1$, $f_2$, $f_3$, $f_5$, and $f_7$. State $S_{10}$ is also produced after step 216 by behavior $c_{13}$, which produces feature $f_7$. Behavior $c_{14}$ produces one or more of the features already present in state $S_{10}$, and so does not result in a new state.

In another execution path, following the process start at step 202, behavior $c_2$ produces feature $f_2$, and so, at step 212, state $S_4$ includes feature $f_2$. Subsequently, behavior $c_5$ produces feature $f_5$, and so, at step 214, state $S_5$ includes features $f_2$ and $f_5$. In an alternative execution path, behavior $c_6$ is performed instead of behavior $c_5$ after step 212. Behavior $c_6$ produces features $f_3$ and $f_4$, and so, at step 220, state $S_8$ includes features $f_2$, $f_3$, and $f_4$. State $S_8$ is also produced in an alternate execution path by behaviors $c_3$ and $c_7$.

After step 214, behavior $c_{10}$ produces features $f_1$ and $f_3$, and so, at step 216, state $S_6$ includes features $f_1$, $f_2$, $f_3$, and $f_5$. Next, behavior $c_{13}$ produces features $f_7$, and so, at step 210, state $S_{10}$ includes features $f_1$, $f_2$, $f_3$, $f_5$, and $f_7$.

In another execution path, following the process start at step 202, behavior $c_3$ produces features $f_3$ and $f_4$, and so, at step 218, state $S_7$ includes features $f_3$ and $f_4$. Next, behavior cis produces one or more of features $f_3$ and $f_4$ again, and so a new state is not produced. Subsequently, behavior $c_7$ produces feature $f_2$, and so, at step 220, state $S_8$ includes features $f_2$, $f_3$, and $f_4$. Next, behavior $c_{11}$ produces feature $f_5$, and so, at step 222, state $S_9$ includes features $f_2$, $f_3$, $f_4$, and $f_5$.

A security component, such as security component 155 of FIG. 1, may observe these behaviors during a learning mode, and so may determine that states $S_1$-$S_{10}$ represent intended states of the process. However, as described below with respect to FIG. 3, states $S_1$-$S_{10}$ may not represent all intended states of the process. Furthermore, security component 155 may not observe all of the behaviors depicted in flow chart 200, as monitoring may not always begin at the process start time, such as if a user activates the security component's learning mode once the process is already executing. Furthermore, not all execution paths of the process may be observed. For example, one or more of the execution paths of the process illustrated in flow chart 200 may occur on a system that is not equipped with the security component or may occur prior to the deployment of the security component. Accordingly, as described in more detail below with respect to FIG. 4, additional intended states may be generated based on the behaviors that have been observed.

Figure 3:
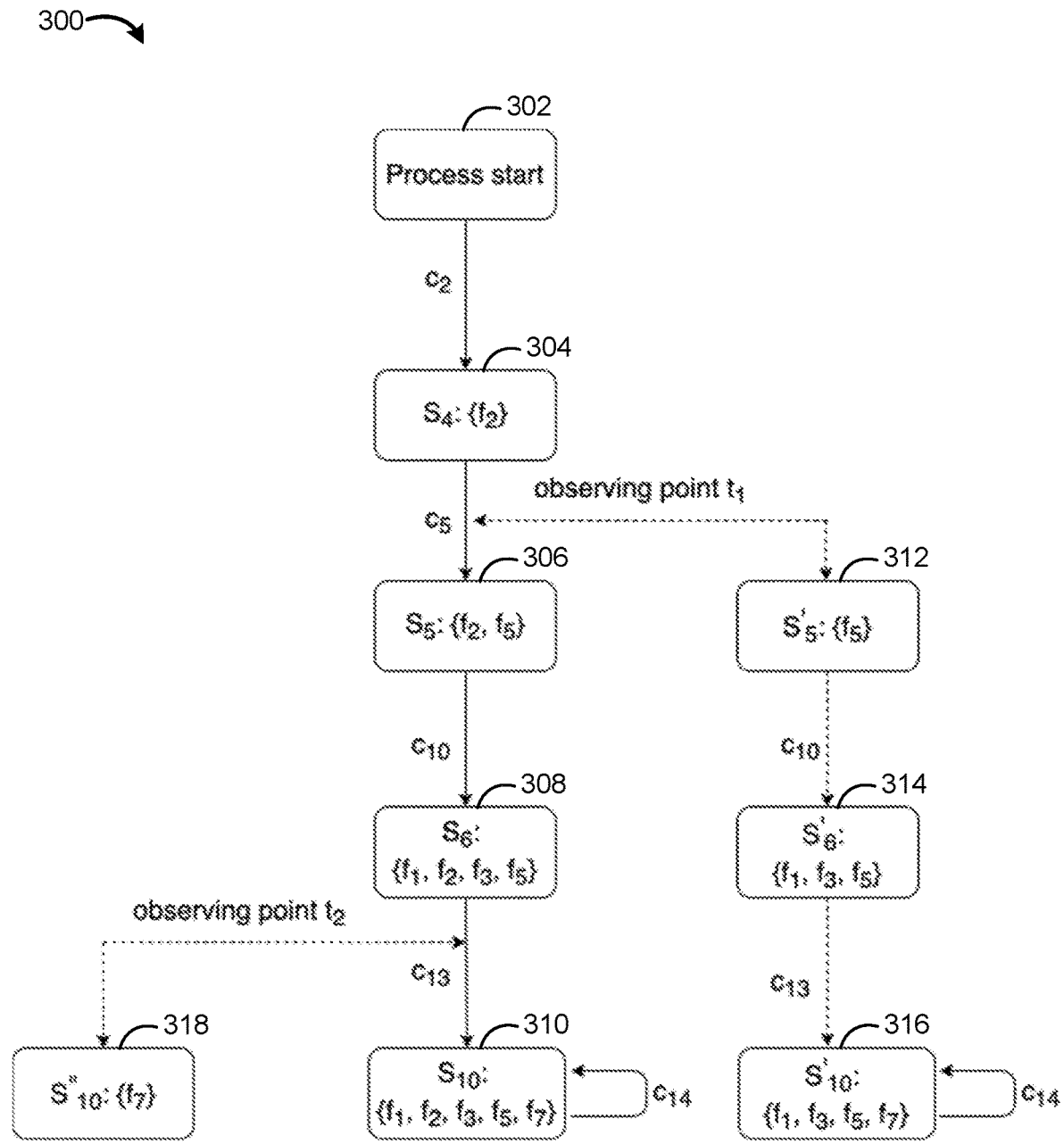
FIG. 3 depicts another example of intended states related to identifying and preventing security threats according to embodiments of the present disclosure.

FIG. 3 is another flow chart 300 illustrating intended states related to identifying and preventing security threats according to embodiments of the present disclosure.

Flow chart 300 depicts an execution path from flow chart 200 of FIG. 2 that includes behaviors $c_2$, $c_5$, $c_{10}$, $c_{13}$, and $c_{14}$ of the process, resulting in states $S_4$, $S_5$, $S_6$, and $S_{10}$. Steps 302, 304, 306, 308, and 310 correspond to steps 202, 212, 214, 216, and 210 of FIG. 2. However, if the security component does not begin observing the behaviors of the process until a point in time after the process start at step 302, then some of the behaviors will be missed.

For example, if observation begins at observation point $t_1$, then behavior $c_2$ is missed. As such, the security component does not observe states $S_4$, $S_5$, $S_6$, and $S_{10}$, observing instead an alternate state $S'_5$ at step 312, in which only the feature $f_5$ produced by behavior $c_5$ is included. Subsequently, the security component observes behavior $c_{10}$, resulting in state $S'_6$ at step 314 and behavior $c_{10}$, resulting in state $S'_{10}$ at step 316. The security component then observes behavior $c_{14}$, resulting again in state $S'_{10}$.

In another example, if observation begins at observation point $t_2$, then behaviors $c_2$, $c_5$, and $c_{10}$ are missed. As such, the security component does not observe states $S_4$, $S_5$, $S_6$, and $S_{10}$, observing instead an alternate state $S'_{10}$ at step 318, in which only the feature $f_7$ produced by behavior $c_{13}$ is included. Observation may stop after step 318 (e.g., if a user turns off learning mode), and so behavior $c_{14}$ may not be observed.

As illustrated in flow chart 300, if observation begins mid-way through process execution, only a limited number of states may be observed. Thus, the security component may have a very limited data set of intended states on which to base security determinations. As such, embodiments of the present disclosure involve generating additional intended states based on those observed, as described below with respect to FIG. 4.

Figure 4:
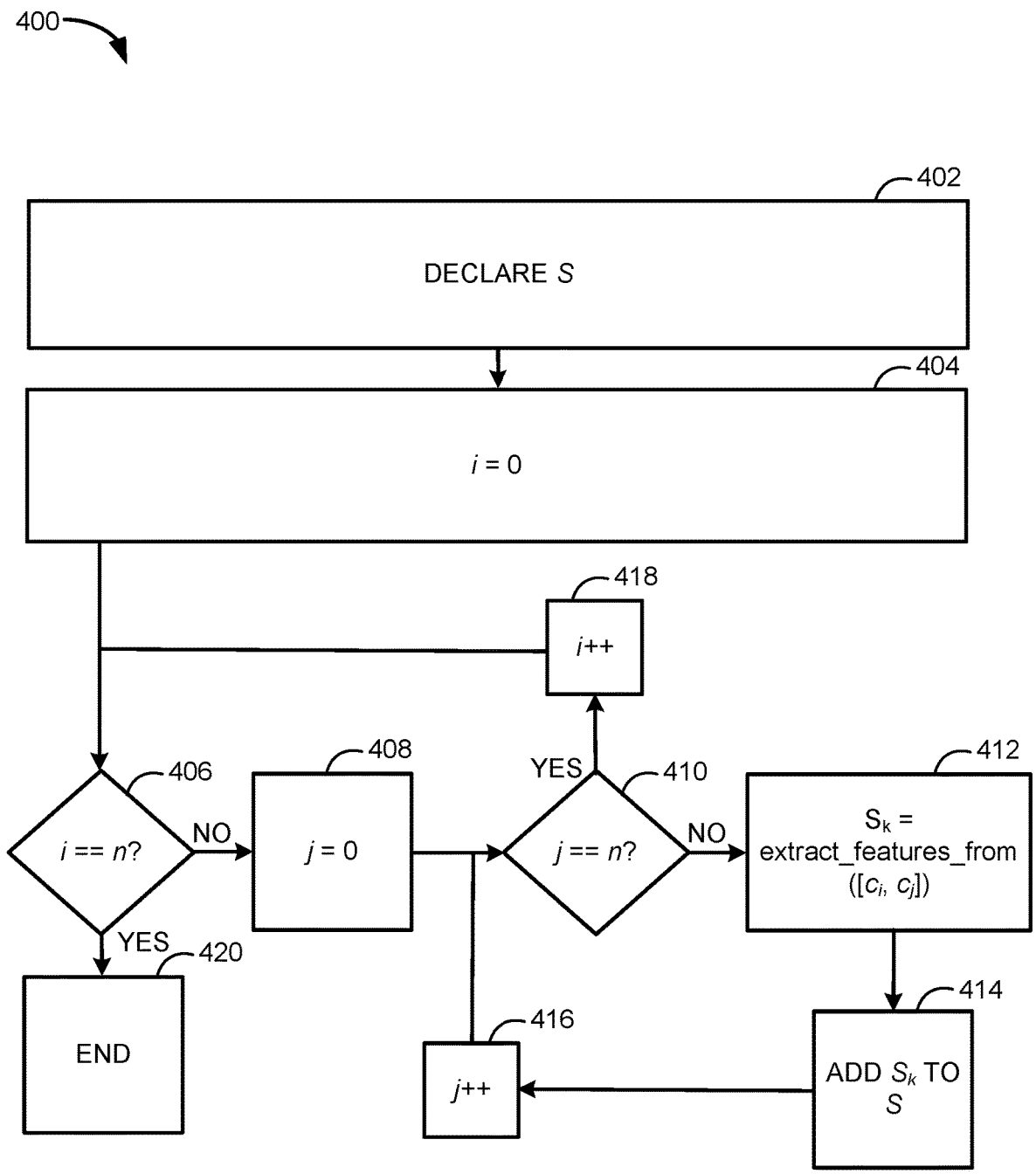
FIG. 4 depicts an example flow chart for generating intended states for identifying and preventing security threats according to embodiments of the present disclosure.

FIG. 4 depicts an example flow chart 400 for generating intended states for identifying and preventing security threats according to embodiments of the present disclosure.

In order to cover as many intended states as possible, regardless of how many or few intended states are actually observed, the algorithm depicted in FIG. 4 is used to generate dummy intended states. For a process instance, its observed behaviors are sorted by time, resulting in a behavior set $C=\{c_1, c_2, \ldots, c_n\}$. Then, starting from behavior $c_1$, intended states are generated from subsets of behaviors, including combinations of behavior $c_1$ with each other behavior, combinations of behavior $c_2$ with each other behavior, and so on.

First, at step 402, a set S of intended states is declared or defined, which may initially be empty (e.g., a new empty set may be initiated). At step 404, a counter variable i is set to 0 to begin an outer loop. At step 406, it is determined whether i is equal to n (which is the number of observed behaviors in behavior set C). If i is equal to n, then the outer loop ends at step 420. If i is not equal to n, an inner loop begins at step 408 by setting another counter variable j to 0. At step 410, it is determined whether j is equal to n. If j is equal to n, then the inner loop has completed, the out loop counter i is incremented by 1 at step 418, and another iteration of the outer loop begins at step 406. If j is not equal to n, an intended state $S_k$ is generated at step 412 by extracting features from a combination of behaviors $c_1$ and $c_j$. Then intended state $S_k$ is added to set S of intended states at step 414. The inner loop counter j is incremented by 1 at step 416, and another iteration of the inner loop begins at step 410.

Flow chart 200 may alternatively be illustrated by the following pseudocode:

```
//input: Behavior set C sorted by timestamp
//output: Generated intended states set S
Declare S
for i = 0 to n do
    for j = 0 to n do
        S_k = extract features from([c_i, c_j])
        Add S_k to S
    end
end
```

Using the algorithm depicted in flow chart 400 and illustrated by the pseudocode above allows for the generation of a potentially very large number of intended states that have not been observed but that are possible for the process.

For example, assuming that observation began at observing point $t_1$ of FIG. 3, and that behaviors $c_5$, $c_{10}$, and $c_{13}$ of FIG. 3 were observed, these behaviors would be sorted by timestamp, and added to a behavior set C with 3 members. In behavior set $C=\{c_1, c_2, c_3\}$, $c_1$ would be $c_5$ of FIG. 3, $c_2$ would be $c_{10}$ of FIG. 3, and $c_3$ would be $c_{13}$ of FIG. 3.

$S_1$ is generated by extracting features from a combination of $c_1$ and $c_1$, resulting in $S_1=\{f_5\}$. $S_2$ is generated by extracting features from a combination of $c_1$ and $c_2$, resulting in $S_2=\{f_1, f_3, f_5\}$. $S_3$ is generated by extracting features from a combination of $c_1$ and $c_3$, resulting in $S_3=\{f_5, f_7\}$.

$S_4$ is generated by extracting features from a combination of $c_2$ and $c_1$, resulting in $S_4=\{f_1, f_3, f_5\}$. $S_5$ is generated by extracting features from a combination of $c_2$ and $c_2$, resulting in $S_5=\{f_1, f_3\}$. $S_6$ is generated by extracting features from a combination of $c_2$ and $c_3$, resulting in $S_6=\{f_1, f_3, f_7\}$.

$S_7$ is generated by extracting features from a combination of $c_3$ and $c_1$, resulting in $$S_7 = \{f_5, f_7\}.$$

$S_8$ is generated by extracting features from a combination of $c_3$ and $c_2$, resulting in $S_8 = \{f_1, f_3, f_7\}$.

$S_9$ is generated by extracting features from a combination

-continued of $c_3$ and $c_3$, resulting in $S_9 = \{f_7\}$.

Thus, while only three intended states were observed, $S'_5$, $S'_6$, and $S'_{10}$, techniques described herein allow for a larger number of intended states, $S_1$-$S_9$ to be generated, some of which are different than those observed. For example, $S_8=\{f_1, f_3, f_7\}$ includes a combination of features that was not observed, but is possible based on the observed behaviors.

In practice, large numbers of behaviors are likely to be observed, and so this technique would result in a very large number of generated intended states that will assist in detecting and preventing security threats. It is noted that the algorithm described with respect to flow chart 400 is only one example, and other algorithms may be employed. For example, combinations of more than two behaviors at a time may be used to generate intended states.

Figure 5:
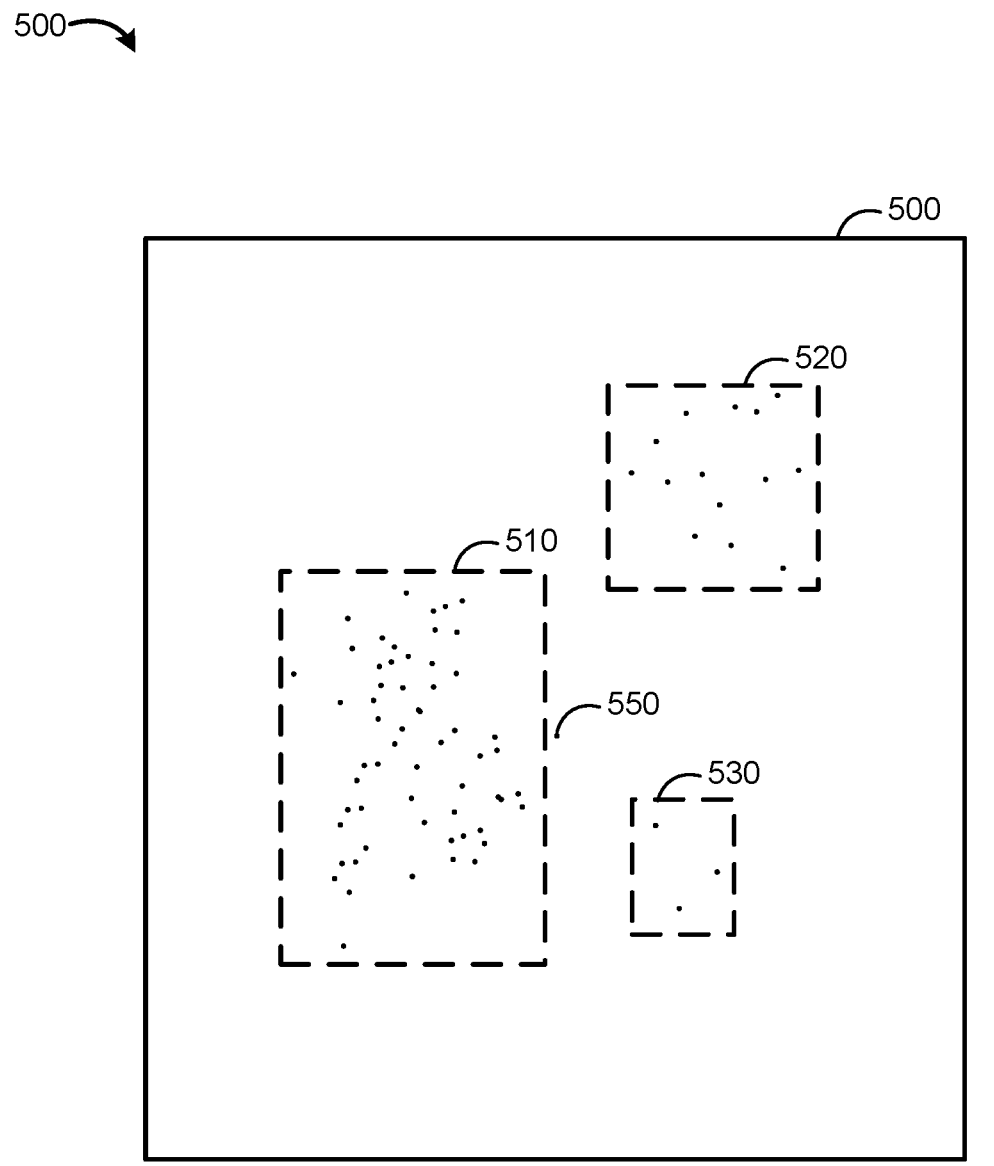
FIG. 5 depicts an example of clustering intended states for identifying and preventing security threats according to embodiments of the present disclosure.

FIG. 5 depicts an example of clustering 500 of intended states for identifying and preventing security threats according to embodiments of the present disclosure.

For example, a clustering algorithm may applied to a plurality of intended states that were observed and/or generated as described above with respect to FIG. 4 to produce clustering 500. In one embodiment, k-means or k-modes clustering is used. As known in the art, in k-means clustering a set of data points is clustered according to existing similarities among the data points in k clusters, with k being given as an input to the algorithm. First, centroids of each of the k clusters (e.g., data points chosen to be the central points of the clusters) are identified, and then distances (e.g., similarities or matches between two data points) of all data points to the centroids are determined in order to identify which cluster each data point belongs to. K-modes is an extension of k-means where, instead of distances, dissimilarities (e.g., total mismatches between two data points) are used.

The number k of clusters may be determined, for example, using the elbow method. As known in the art, the elbow method involves plotting explained variation (e.g., the proportion to which a mathematical model accounts for variation of a data set, which may be represented as the ratio of between-group variance to the total variance) as a function of the number of clusters, and picking the "elbow" of the curve (e.g., the point where diminishing returns no longer justify the cost of additional clusters) as the number k of clusters to use.

In clustering 500, the clustering algorithm results in clusters 510, 520, and 530, each of which includes a plurality of data points (e.g., feature vectors) representing intended states.

State 550 represents a new state observed by the security component, such as in protected mode, when the security component is monitoring behaviors of the process to determine whether a security threat may be present. As such, state 550 is compared to the intended stated in order to determine whether it represents novel or anomalous behavior.

The intended states have been clustered as illustrated in clustering 500, and so it is first determined which cluster state 550 is closest to. For example, the feature vector of state 550 may be compared to centroid points (and/or additional reference points) of each of clusters 510, 520, and 530 to determine which of the clusters it corresponds to. In one embodiment, it is determined that state 550 is closest to cluster 510, and so cluster 510 is used to determine whether state 550 represents a threat.

According to embodiments of the present disclosure, different novelty detection techniques may be used depending on the size of the cluster. For example, a tree-based model such as an isolation forest model may be used to detect novelty for large clusters (e.g., more than one hundred intended states), a similarity measure such as edit distance or Hamming distance may be used to detect novelty for medium clusters (e.g., more than ten and less than one hundred intended states), and a manual review process may be used to detect novelty for small clusters (e.g., of ten or less). These numbers are only included as examples of sizes of clusters, and different numbers may be used as thresholds for selection of different novelty detection techniques.

For example, some clusters may have more than 90,000 data points, while other clusters may have less than 100 points in it. Furthermore, some clusters may have so few data points that an accurate determination cannot be made in an automated fashion. Because of the large amount of potential variance in cluster size, different novelty detection techniques may be more effective for different clusters.

A tree-based model makes a classification by dividing inputs into smaller classifications at nodes, which result in an ultimate classification at a leaf. An isolation forest extends the concept of a tree-based classifier, and further involves recursively generating partitions on the sample by selecting an attribute with some amount of randomness and then selecting a split value for the attribute, also with some amount of randomness, between the minimum and maximum values allowed for that attribute. An isolation forest works on the principle of isolating anomalies, instead of the more commonly employed techniques of profiling normal points.

In some embodiments, an isolation forest model includes a number of independent decision trees, each decision tree being trained with different sets of sampled data from the dataset (e.g., different subsets of intended states from a given cluster). The output of a decision tree does not depend on the output of another tree, but the final output class of the model depends on the output from each tree, such as a class that is predicted by the highest number of trees. An isolation forest is included as an example, and other types of machine learning models may alternatively be used to perform techniques described herein.

Tree-based models such as isolation forest models may be effectively employed for larger clusters, as these clusters may contain enough data points to build decision trees that will produce accurate results. For smaller clusters, a similarity algorithm may be used, such as calculating edit distances or weighted hamming distances between a given state and each intended state within the cluster. An edit distance is a measure of distance between two strings (not necessarily binary strings) that is calculated by determining the number of edits that are needed to convert the first string to the second string. A Hamming distance is a metric for comparing two binary data strings. When comparing two binary strings of equal length, the Hamming distance is the number of bit positions in which the two bits are different.

According to certain embodiments, a weighted Hamming distance is used as a novelty detection technique for smaller or medium-sized clusters. A weighted Hamming distance may be defined as follows:

$$d_{WH}(x,y) = \Sigma_{i=1}^{d} w_i |x_i - y_i|,$$

where the weight $w_i$ is 1 if the entropy of ith column is 0. Otherwise the weight $w_i$ is the multiplicative inverse of the entropy of the ith column. A state may be considered novel compared to the intended states in a given cluster if, for example, the average weighted Hamming distance between the state and the intended states exceeds a threshold.

In some cases, a cluster contains too few data points to make an automated novelty determination. As such, a user may be prompted to review and provide feedback for states with respect to these small clusters. For example, the user may be provided with the features of the state as well as the features of the intended states in the cluster, and the user may determine whether the state is anomalous compared to the intended states, providing feedback indicating one way or the other.

In an example, if state 550 is determined to correspond to cluster 510 (e.g., representative of a large cluster), then an isolation forest may be used to determine whether state 550 is novel compared to the intended states in cluster 510. If state 550 is determined to correspond to cluster 520 (e.g., representative of a medium cluster), then weighted Hamming distances may be used to determine whether state 550 is novel compared to the intended states in cluster 520. Finally, if state 550 is determined to correspond to cluster 530 (e.g., representative of a small cluster), then manual review may be used to determine whether state 550 is novel compared to the intended states in cluster 530.

If a state is determined to be novel compared to the intended states, then the security component may take one or more actions to prevent a potential security threat. For example, the security component may provide an alert to the management plane indicating that the novel state has been detected as a potential security threat. The security component may also block traffic related to the process, remove the process from the system, notify a firewall component to filter traffic related to the potential security threat, and/or the like.

Performance testing of the techniques described herein have shown substantial performance improvements over conventional techniques. For example, compared to conventional rule-based threat detection techniques, embodiments of the present disclosure resulted in a 25% increase in process card coverage, a 50% increase in command line interface (CLI) coverage in a process card, an 11% increase in overall alarm event coverage, a 33% increase in overall unique behavior coverage, and a 3% reduction in average false positive rate.

Figure 6:
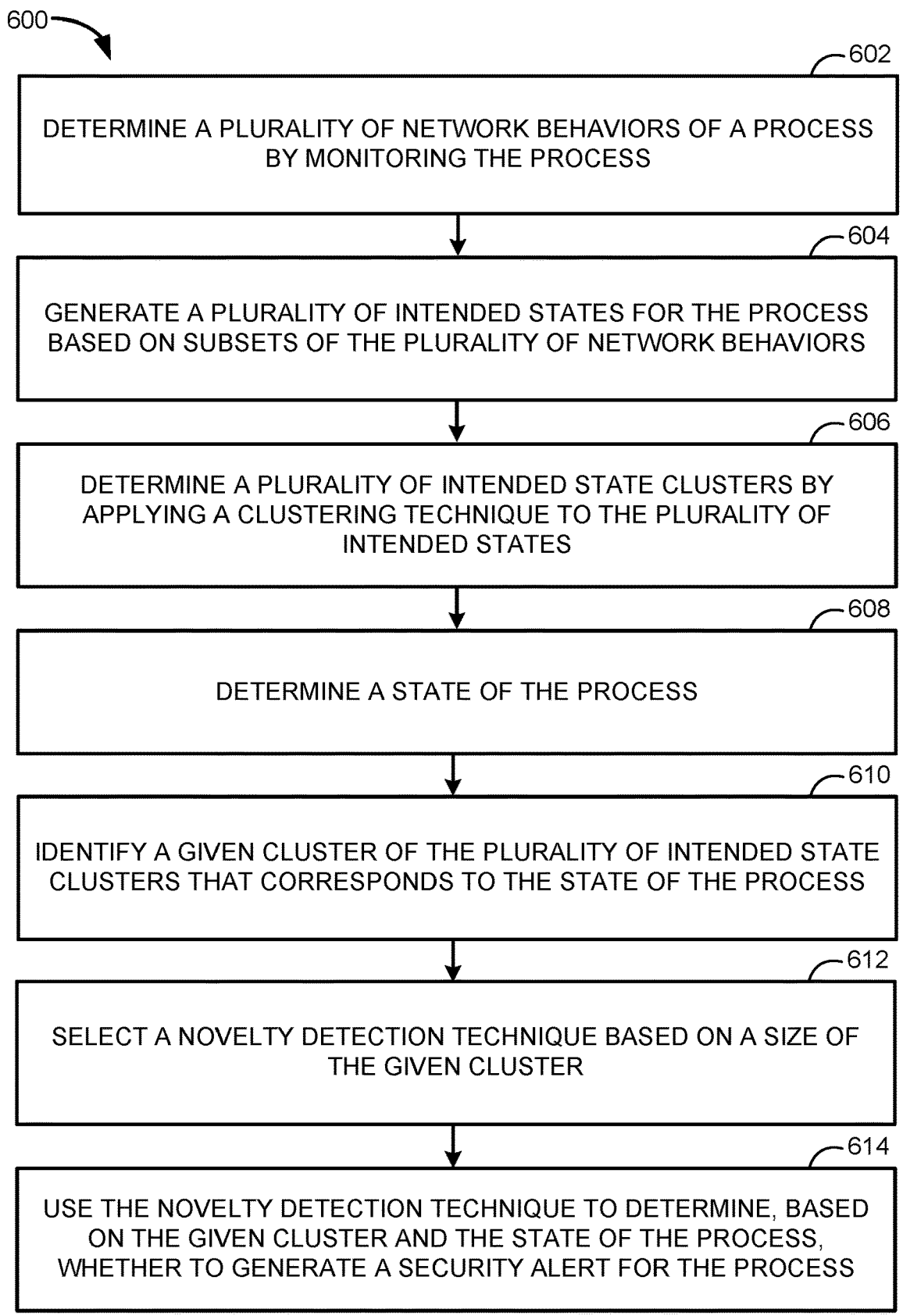
FIG. 6 depicts an example flow chart for identifying and preventing security threats according to embodiments of the present disclosure.

FIG. 6 depicts an example flowchart 600 for identifying and preventing security threats according to embodiments of the present disclosure. For example, flowchart 600 may represent operations performed by security component 155 of FIG. 1.

At step 602, a plurality of network behaviors of a process are determined by monitoring the process.

At step 604, a plurality of intended states for the process are generated based on subsets of the plurality of network behaviors.

At step 606, a plurality of intended state clusters are determined by applying a clustering technique to the plurality of intended states.

At step 608, a state of the process is determined.

At step 610, a given cluster of the plurality of intended state clusters is identified that corresponds to the state of the process.

At step 612, a novelty detection technique is selected based on a size of the given cluster.

At step 614, the novelty detection technique is used to determine, based on the given cluster and the state of the process, whether to generate a security alert for the process.

In some embodiments, generating the plurality of intended states of the process comprises extracting features from the subsets of the plurality of network behaviors to produce feature vectors.

In certain embodiments, applying the clustering technique to the plurality of intended states comprises applying k-modes or k-means clustering to the feature vectors.

In some embodiments, identifying the given cluster of the plurality of intended state clusters that corresponds to the state of the process comprises comparing the state of the process to a reference point of the given cluster.

In certain embodiments, the novelty detection technique is selected from: a tree-based model; weighted hamming distances; or review by a user.

In some embodiments, the security alert is generated if the novelty detection technique indicates that the state of the process is an anomaly.

In certain embodiments, the state of the process comprises a feature vector indicating one or more of: the process did or did not make outbound public address access; the process did or did not make outbound private address access; the process did or did not make an outbound connection on an ephemeral port; the process did or did not make an outbound connection on an a well-known port; the process did or did not receive an inbound connection on an ephemeral port; the process did or did not receive an inbound connection on an a well-known port; the process did or did not make an outbound connection on an a specific port; or the process did or did not receive an inbound connection on a particular port.

It is noted that while certain embodiments of the present disclosure are described with respect to virtual components (e.g., VCIs), techniques described herein may also be implemented with physical components.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of detecting and preventing attacks in a network, comprising:
   determining a plurality of network behaviors of a process by monitoring the process;
   generating a plurality of intended states for the process based on subsets of the plurality of network behaviors;
   determining a plurality of intended state clusters by applying a clustering technique to the plurality of intended states;
   determining a state of the process;
   identifying a given cluster of the plurality of intended state clusters that corresponds to the state of the process;
   selecting a novelty detection technique from a plurality of novelty detection techniques based on whether a size of the given cluster exceeds a size threshold; and
   using the novelty detection technique to determine, based on the given cluster and the state of the process, whether to generate a security alert for the process.

2. The method of claim 1, wherein generating the plurality of intended states of the process comprises extracting features from the subsets of the plurality of network behaviors to produce feature vectors.

3. The method of claim 2, wherein applying the clustering technique to the plurality of intended states comprises applying k-modes or k-means clustering to the feature vectors.

4. The method of claim 1, wherein identifying the given cluster of the plurality of intended state clusters that corresponds to the state of the process comprises comparing the state of the process to a reference point of the given cluster.

5. The method of claim 1, wherein the novelty detection technique is selected from:
   a tree-based model;
   weighted hamming distances; or
   review by a user.

6. The method of claim 1, wherein the security alert is generated if the novelty detection technique indicates that the state of the process is an anomaly.

7. The method of claim 1, wherein the state of the process comprises a feature vector indicating one or more of:
   the process did or did not make outbound public address access;
   the process did or did not make outbound private address access;

the process did or did not make an outbound connection on an ephemeral port;
the process did or did not make an outbound connection on an a well-known port;
the process did or did not receive an inbound connection on an ephemeral port;
the process did or did not receive an inbound connection on an a well-known port;
the process did or did not make an outbound connection on an a specific port; or
the process did or did not receive an inbound connection on a particular port.

8. A system, comprising: one or more processors; and a non-transitory computer-readable medium comprising instructions that, when executed by the one or more processors, cause the system to:
determine a plurality of network behaviors of a process by monitoring the process;
generate a plurality of intended states for the process based on subsets of the plurality of network behaviors;
determine a plurality of intended state clusters by applying a clustering technique to the plurality of intended states;
determine a state of the process;
identify a given cluster of the plurality of intended state clusters that corresponds to the state of the process;
select a novelty detection technique from a plurality of novelty detection techniques based on whether a size of the given cluster exceeds a size threshold; and
use the novelty detection technique to determine, based on the given cluster and the state of the process, whether to generate a security alert for the process.

9. The system of claim 8, wherein generating the plurality of intended states of the process comprises extracting features from the subsets of the plurality of network behaviors to produce feature vectors.

10. The system of claim 9, wherein applying the clustering technique to the plurality of intended states comprises applying k-modes or k-means clustering to the feature vectors.

11. The system of claim 8, wherein identifying the given cluster of the plurality of intended state clusters that corresponds to the state of the process comprises comparing the state of the process to a reference point of the given cluster.

12. The system of claim 8, wherein the novelty detection technique is selected from:
a tree-based model;
weighted hamming distances; or
review by a user.

13. The system of claim 8, wherein the security alert is generated if the novelty detection technique indicates that the state of the process is an anomaly.

14. The system of claim 8, wherein the state of the process comprises a feature vector indicating one or more of:
the process did or did not make outbound public address access;
the process did or did not make outbound private address access;
the process did or did not make an outbound connection on an ephemeral port;
the process did or did not make an outbound connection on an a well-known port;
the process did or did not receive an inbound connection on an ephemeral port;
the process did or did not receive an inbound connection on an a well-known port;
the process did or did not make an outbound connection on an a specific port; or
the process did or did not receive an inbound connection on a particular port.

15. A non-transitory computer-readable medium comprising instructions that, when executed by one or more processors of a computing system, cause the computing system to:
determine a plurality of network behaviors of a process by monitoring the process;
generate a plurality of intended states for the process based on subsets of the plurality of network behaviors;
determine a plurality of intended state clusters by applying a clustering technique to the plurality of intended states;
determine a state of the process;
identify a given cluster of the plurality of intended state clusters that corresponds to the state of the process;
select a novelty detection technique from a plurality of novelty detection techniques based on whether a size of the given cluster exceeds a size threshold; and
use the novelty detection technique to determine, based on the given cluster and the state of the process, whether to generate a security alert for the process.

16. The non-transitory computer-readable medium of claim 15, wherein generating the plurality of intended states of the process comprises extracting features from the subsets of the plurality of network behaviors to produce feature vectors.

17. The non-transitory computer-readable medium of claim 16, wherein applying the clustering technique to the plurality of intended states comprises applying k-modes or k-means clustering to the feature vectors.

18. The non-transitory computer-readable medium of claim 15, wherein identifying the given cluster of the plurality of intended state clusters that corresponds to the state of the process comprises comparing the state of the process to a reference point of the given cluster.

19. The non-transitory computer-readable medium of claim 15, wherein the novelty detection technique is selected from:
a tree-based model;
weighted hamming distances; or
review by a user.

20. The non-transitory computer-readable medium of claim 15, wherein the security alert is generated if the novelty detection technique indicates that the state of the process is an anomaly.

* * * * *